United States Patent [19]
Kotlar

[11] Patent Number: 5,325,561
[45] Date of Patent: Jul. 5, 1994

[54] HEATED FLEXIBLE WINDSHIELD WIPER

[76] Inventor: Edward A. Kotlar, 8111 Castle Pines Ave., Las Vegas, Nev. 89113

[21] Appl. No.: 698,372

[22] Filed: May 9, 1991

Related U.S. Application Data

[63] Continuation of Ser. No. 522,078, May 10, 1990, abandoned, which is a continuation of Ser. No. 375,695, Jul. 5, 1989, abandoned.

[51] Int. Cl.⁵ .............................. B60S 1/38; B60S 1/04
[52] U.S. Cl. .............................. 15/250.06; 15/250.05; 219/202
[58] Field of Search ........... 15/250.05, 250.06, 250.07, 15/250.08, 250.09; 219/202

[56] References Cited

U.S. PATENT DOCUMENTS

| | | | |
|---|---|---|---|
| 3,409,930 | 11/1968 | Linker | 15/250.06 |
| 3,587,129 | 6/1971 | Linker | 15/250.06 |
| 3,639,938 | 2/1972 | Golden | 15/250.06 |
| 4,325,160 | 4/1982 | Burgess | 15/250.06 |
| 4,360,941 | 11/1982 | Mabie | 15/250.06 |
| 4,387,290 | 6/1983 | Yasuda | 15/250.07 |
| 4,497,083 | 2/1985 | Nielsen, Jr. et al. | 15/250.06 |
| 4,670,933 | 6/1987 | Toplenszky | 15/250.07 |
| 4,928,345 | 5/1990 | Meltzer et al. | 15/250.06 |

FOREIGN PATENT DOCUMENTS

| | | | |
|---|---|---|---|
| 755291 | 3/1967 | Canada | 15/250.06 |
| 816355 | 7/1969 | Canada | 15/250.06 |
| 962813 | 2/1975 | Canada | 15/250.06 |
| 253617 | 12/1948 | Switzerland | 15/250.06 |

*Primary Examiner*—Timothy F. Simone
*Assistant Examiner*—Gary K. Graham
*Attorney, Agent, or Firm*—Barnes, Kisselle, Raisch, Choate, Whittemore & Hulbert

[57] ABSTRACT

A vehicle windshield wiper assembly with a thin elongate and very flexible heater wire disposed in and extending longitudinally throughout the body of a flexible wiper blade. To enhance removal of ice and snow preferably the blade retainer and linkage of the wiper assembly is enclosed in a flexible cover which preferably defines a dead air space which is preferably also heated somewhat by operation of the heater element.

9 Claims, 2 Drawing Sheets

HEATED FLEXIBLE WINDSHIELD WIPER

REFERENCE TO CO-PENDING APPLICATION

This is a continuation application of co-pending U.S. patent application Ser. No. 07/522,078, filed May 10, 1990, now abandoned, which was a continuation application of then co-pending U.S. patent application Ser. No. 07/375,695, filed on Jul. 5, 1989, now abandoned.

FIELD OF THE INVENTION

This invention relates to windshield wipers for vehicles and more particularly to windshield wipers used under conditions where ice and snow build up on the windshield wiper assembly.

BACKGROUND OF THE INVENTION

There have been a variety of attempts to improve the wiping action of a windshield wiper to clean the outer surface of a windshield in cold weather. U.S. Pat. No. 3,718,940 shows an electric resistance heating element consisting of flat plate sections joined by coupling sections. The element is several thousandths of an inch in thickness and $\frac{1}{8}$" (0.125") or more in depth. The element is within the wiper blade and is said to reinforce and thereby stiffen the blade. This limits the flexibility of the blade and inhibits its wiping action.

U.S. Pat. No. 3,936,901 discloses a blade having an internal cavity for receiving water and electrical heating elements. The elements and water distribute heat through the blade. The heating of water or ice, which then heats the blade, is an indirect and, therefore, ineffective means of heating the blade.

U.S. Pat. No. 4,152,808 discloses a heating element $\frac{1}{8}$" (0.125") wide and 0.005" thick embedded in the sides of a frame adapted to receive a wiper blade. In the upward direction, heat is transferred to the frame and linkage elements. In the downward direction, heat is transferred from the element to the frame, from the frame through a gap in the wiper body carrying the blade and finally down to the blade. In the outward lateral direction, heat is transferred to the surrounding air and essentially wasted. This indirect heating method is accordingly ineffective, inefficient, and limits the flexibility of the blade, thereby inhibiting the blade wiping action.

These most recent examples of the art contain electric heating elements which impede the flexibility of the wiper blade. The methods are indirect, ineffective and inefficient attempts to restore proper flexing and wiping action in cold weather. Proper flexing is particularly important given the substantial bending and compound curvature of current automobile windows.

In another approach, the windshield wiper frame and flexible linkages are enclosed in a heated envelope (U.S. Pat. Nos. 3,523,626 and 3,619,556). In U.S. Pat. No. 3,523,626, the envelope is filled with a heated fluid. These designs are meant to heat the frame and linkages to remove ice and snow which interfere with the movement of the frame and linkages. These heated envelopes are cumbersome and impede flexing action. In these indirect heating methods, electrical energy is used ineffectively and inefficiently in an attempt to improve the wiping action.

In summary, the foregoing prior art has not solved the problem of providing satisfactory wiping performance in frigid snowy and icy conditions while simultaneously removing and keeping the wiper blade, frame and linkages free from interference by ice and snow.

SUMMARY OF THE INVENTION

In accordance with this invention, a heated windshield wiper has a thin and flexible elongate electric heater element disposed in a flexible wiper body which carries a blade for wiping a vehicle windshield. The heating element has an optimal size, heat emitting capability, flexibility and orientation to the blade to directly, effectively and efficiently heat the blade sufficiently to melt ice and snow without impeding the operation and wiping performance of the blade.

To enhance wiping performancne, preferably the wiper body has a hinge section carrying the blade. The rubber-like wiper body is carried by a frame which is connected by linkages to an oscillating arm. Preferably a thin, flexible protective covering encloses the frame and linkages and may also be heated by the element.

Electric power is supplied to the heating element from the vehicle's power supply through control circuitry. Preferably, the control circuitry provides power to the element when both a manually operable switch on the dash and the vehicle's ignition switch are closed. Preferably, the control circuitry includes a timer which automatically terminates the supply of power to the heating element after a period of time which is normally sufficient to melt ice from the wiper. The control circuitry is connected by wires to the heating element preferably by removable connectors and conductive end caps located at each end of the wiper body.

Preferably the body, element, covering, connectors and end caps are removably attached for easy repair and replacement.

Objects, features and advantages of this invention are to provide highly satisfactory wiping performance in frigid snowy and icy conditions, a direct, effective, efficient and flexible heating element for a windshield wiper blade to enhance its flexibility and improve the wiping action of the blade; to provide a flexible hinge section to further enhance the wiping action and flexibility required to effectively conform to the compound curvature of a windshield to effectively wipe it; and to keep the frame and linkages free of ice and snow with little or no heating.

DETAILED DESCRIPTION

Figure 1:
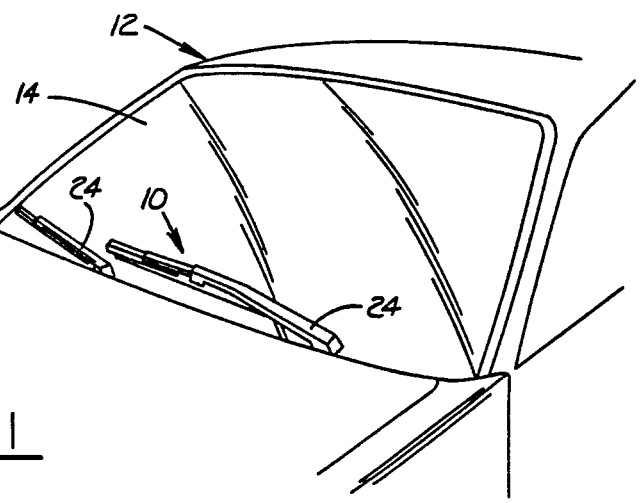
FIG. 1 is a fragmentary perspective view of an automobile with windshield wipers embodying this invention.
Figure 2:
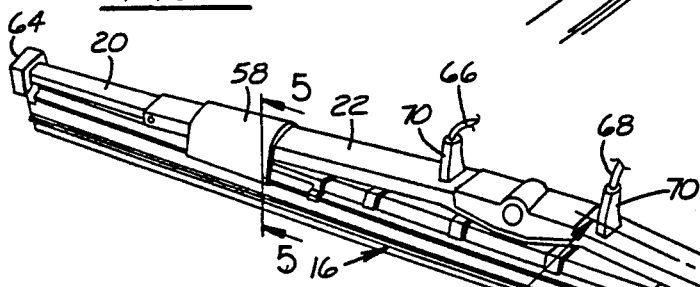
FIG. 2 is a perspective view of the windshield wiper with portions of the flexible cover broken away to expose the frame and linkages.

FIG. 1 illustrates a windshield wiper assembly 10 embodying this invention mounted on an automobile 12 for wiping its front windshield 14. As shown in FIGS. 1 and 2, preferably each assembly has a wiper blade 16 received in a flexible retainer 18 carried by a pair of spaced apart bows 20 each pivotally connected to a yoke 22. The yoke is pivotally connected to an arm 24 which, in operation, is oscillated to impart a wiping action to its associated wiper assembly. The wiper blade 16 is slidably received in the retainer 18 which is releasably connected to the bows 20. The retainer has a pair of elongate flexible rails 26 preferably of metal which are held in parallel spaced apart relationship by U-shape struts 28 which are preferably integral with the rails.

Figure 3:
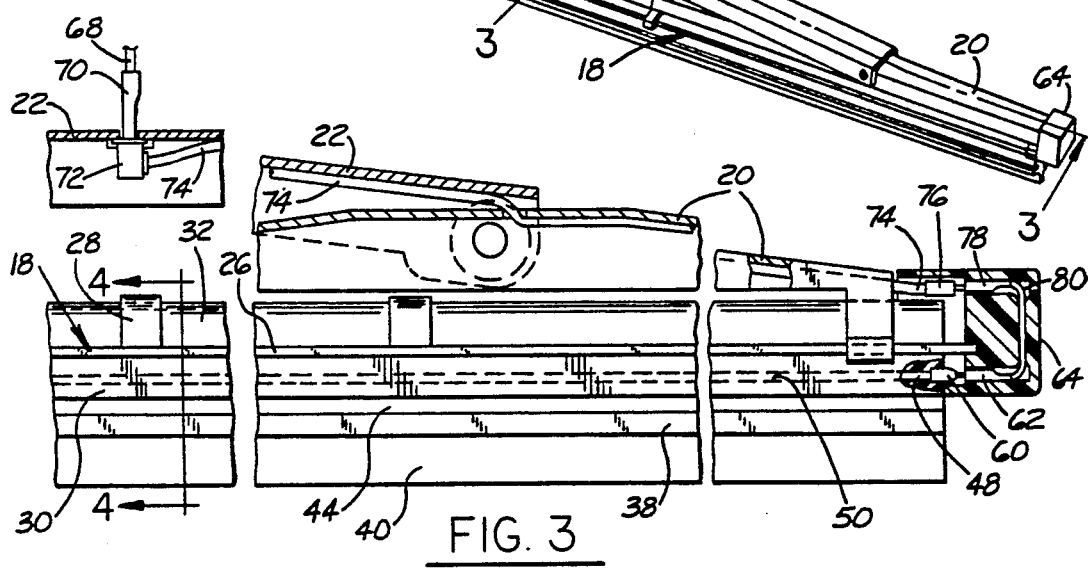
FIG. 3 is a fragmentary sectional view taken along line 3—3 of FIG. 2 illustrating the wires, end caps, electrical connectors and adapters and the heating element.
Figure 4:
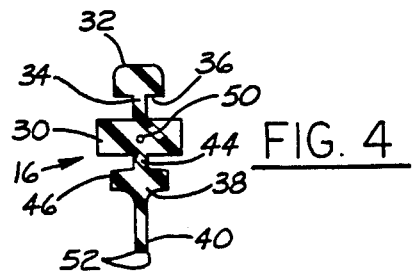
FIG. 4 is a sectional view of the wiper blade taken generally along line 4—4 of FIG. 3.
Figure 5:
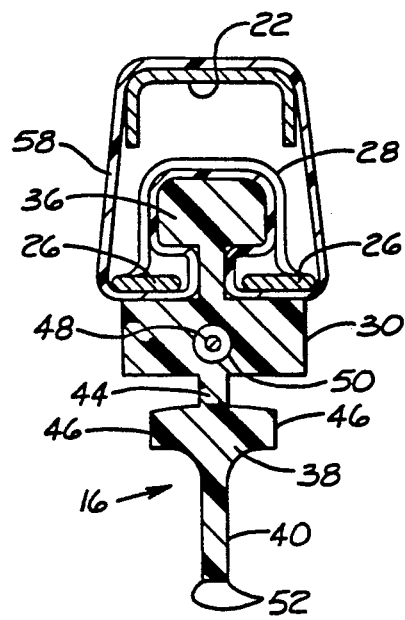
FIG. 5 is a sectional view taken generally along line 5—5 of FIG. 2 and illustrating the flexible cover of the wiper assembly.

Each wiper blade 16 has an elongate flexible body of a rubber-like material, such as neoprene. As shown in FIG. 3, each blade has a central portion 30 and head 32 interconnected by an integral web 34 which cooperate to define parallel opposed grooves 36 which, in assembly, slidably receive the rails 26 of the retainer. The windshield is wiped by an elongate squeegee 38 with a thin lip 40 which is preferably connected to the central portion by a living hinge in the form of a thin integral web 44. The wiping action of the squeegee 38 is improved by the living hinge which permits the squeegee to rock or become canted with respect to the central portion 30 so that the windshield is wiped by one side of the lip 34 when the arm traverses the blade in one direction, and by the other side of the lip, when the arm traverses the blade in the other direction. Preferably projecting rib portions 46 of the squeegee limit the extent of its rocking movement by bearing on the central portion. This also provides a variable resistance to the rocking movement of the squeegee with a low resistance being provided initially by the living hinge 44 and substantially greater resistance being provided by engagement of one of the ribs 46 with the central portion 30.

In accordance with this invention, the wiper blade 16 is heated by an elongate electric resistance heating element or wire 48. Preferably, the wire 48 is received in an elongate passage 50 extending axially throughout the central portion.

Preferably, to provide the desired flexibility and sufficient heat to rapidly melt ice and snow, the heater element 48 is a Nichrome wire having a nominal diameter of 0.0125 of an inch and an electrical resistance of about 0.11 ohms per lineal inch of wire. It is believed that Nichrome wire having a diameter greater than about 0.025 of an inch will be sufficiently inflexible to impede the wiping performance of the wiper assembly. To facilitate inserting the wire in the blade, preferably the passage has a diameter of about 0.040 of an inch.

Preferably, the blade 16 is extruded and the passage is formed therein while extruding the blade. However, if desired, the blade could be molded. Preferably, after either extrusion or molding, the bottom of the lip 40 of the blade is trimmed to provide a flat bottom and square sharp edges 52 for improved wiping performance of the blade.

Figure 6:
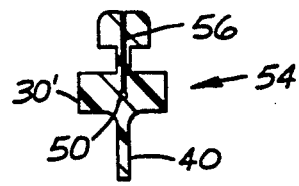
FIG. 6 is a sectional view of an alternative form of the wiper blade.
Figure 7:
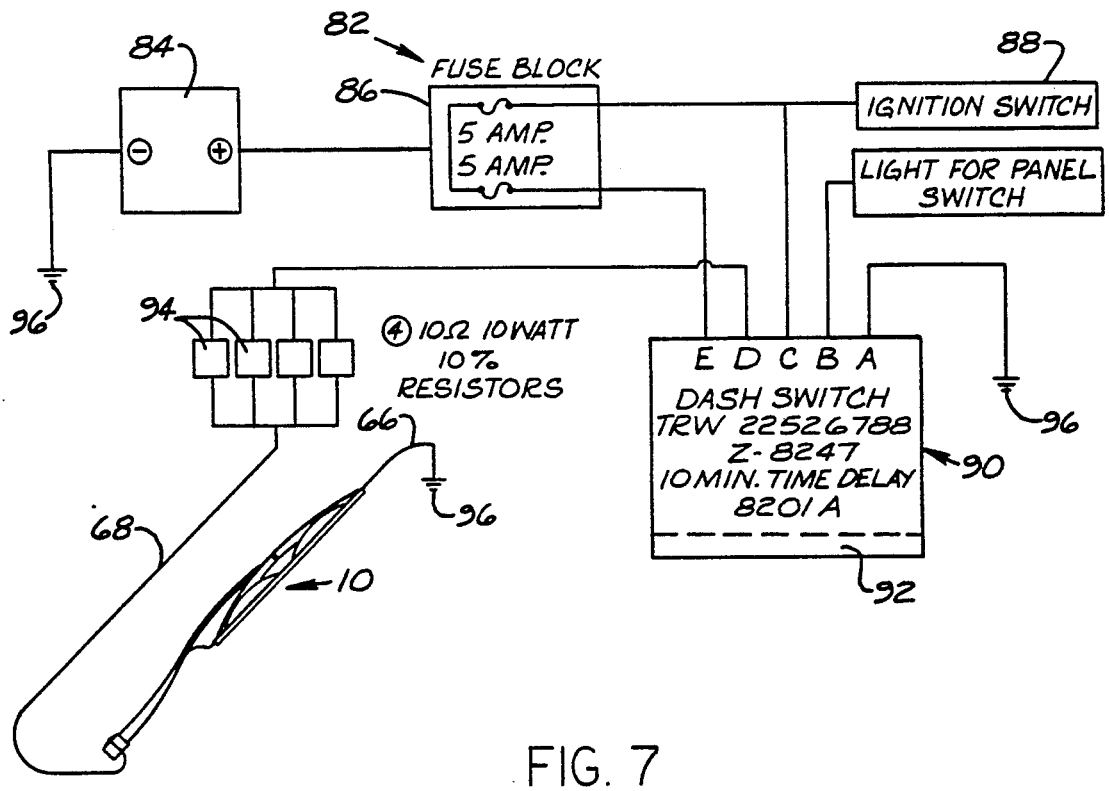
FIG. 7 is a schematic of the electric control circuitry for the wiper assembly.

FIG. 6 illustrates a modified embodiment of a wiper blade 54 in which the living hinge has been eliminated and the squeegee lip 40 depends directly from the central portion 30' of the body. In this modification the blade 54 is molded and preferably has a central slit 56 to accommodate a support in the mold for the core forming the passage 50. If desired, the heater wire 48 can also be inserted into the blade through this slit 56.

To prevent ice and snow from accumulating in the linkage, preferably a flexible protective and water-proof cover 58 is wrapped around and encloses the retainer 18, bows 20 and yoke 22 of the wiper assembly. Preferably, the cover is of neoprene, rubber or other flexible and water-proof material. In operation of the wiper assembly, movement of its various component parts tends to flex this cover, thereby sluffing off of it snow and ice which permits the various elements enclosed by the cover to operate in their normal manner. Moreover, it is believed that in operation of the wiper assembly, this cover and the dead air space it defines are heated somewhat by the heater wire 48 which also facilitates removal of ice and snow therefrom.

As shown in FIG. 3, the heater wire 48 extends throughout the length of the blade 16 and its ends are electrically connected to spade plugs 60 removably received in receptacle connectors 62 disposed in end caps 64. Electric power is supplied to the heater element via wires 66 & 68 with spade plugs 70 removably received in receptacle connectors 72 mounted on the yoke 22 and connected to wires 74 with spade plugs 76 removably received in receptacle connectors 78 mounted in the end caps 64 and connected by wires 80 to the receptacles 62.

Power is supplied to the heater element 48 of each blade 16 through electric control circuitry 82 shown schematically in FIG. 8. Power is provided by the vehicle battery 84 through a fuse block 86 and the vehicle ignition switch 88 to a timer control 90 with a dash switch 92. The timer control 90 may be energized only when both the dash and ignition switches are turned on. When energized, the control 90 supplies current to the heater element 48 in each wiper blade through four resistors 94 connected in parallel. The heater elements 48 of the wiper blades are connected in parallel with the resistors 94 through wires 66 & 68 and the common ground 96 of the vehicle electric system. The ten minute cycle of the control can be interrupted by either turning off its dash switch or the vehicle ignition switch. When energized, preferably this control also provides power to a light 98 on the vehicle dash panel to indicate the windshield wiper heater elements have been energized. Preferably, the switch 92 of the control is located on the dash in the passenger compartment adjacent the driver seat of the vehicle. A suitable control 90 is commercially available from TRW, Inc. as Part No. 22526788Z-8247.

In a practical application using this commercially available control 90, four ten ohm and ten watt resistors 94 in parallel with two heater elements 48 connected in parallel were found to be highly satisfactory. With this arrangement, a current of about 1.3 amps was applied to each heater element which rapidly raises the temperature of its associated wiper blade to about 95° F. when they are encased in a layer of ice about ⅛" thick. Preferably, the wiper blades are heated to a temperature in the range of about 80° F. to about 110° F. However, if desired wiper blades of neoprene can be heated to a temperature of about 200° F. without any apparent deterioration of the blades or their wiping performance.

I claim:
1. A heated windshield wiper device constructed and arranged to wipe a windshield of a vehicle comprising:

a one piece elongated and flexible body of an elastomeric material which does not deteriorate when in use at temperatures of up to 200° F. having:

an elongated and flexible mid portion;

an elongated and flexible head portion carried by the mid portion;

an elongated and flexible hinge portion carried by the mid portion;

an elongated and flexible lip portion carried by the hinge portion and having a free edge for wiping the windshield;

said hinge portion in cross-section being thin relative to adjacent portions of said mid and lip portions to permit said lip portion to rock relative to said mid portion and having generally opposed grooves opening outwardly on opposite sides of said hinge and disposed between said mid and lip portions;

an elongated passage in the mid portion and directly overlying the hinge portion and the free edge of the lip portion of the body and extending longitudinally in the mid portion generally parallel to the free edge of the lip and the passage not being greater than approximately 0.040 of an inch in diameter; and only one elongated and flexible electric resistance heater element in said flexible body and disposed in the passage and extending longitudinally therein and in heat transfer relationship with the adjacent hinge and lip portions and being not greater than about 0.025 of an inch in diameter.

2. The device of claim 1 wherein the heater element extends longitudinally at least substantially throughout the body.

3. The device of claim 1 wherein the heater element has a diameter of approximately 0.012 of an inch.

4. The device of claim 1 which also comprises a flexible retainer connected to linkages, the body being carried by the retainer and a flexible protective cover enclosing the retainer and the linkages.

5. The device of claim 4 wherein the body has a pair of generally opposed grooves and a portion of the retainer is received in the grooves.

6. The device of claim 1 which also comprises switch means for connecting the power supply of the vehicle to the heater element and timer means for automatically disconnecting the supply of power after a predetermined time period during which the switch means is closed to supply power to the heater element.

7. The device of claim 6 which also comprises regulating means for maintaining the temperature of the flexible body in the range of 80° F. to 110° F. substantially throughout the time period.

8. The device of claim 7 in which the regulating means comprises resistors.

9. A heated windshield wiper device constructed and arranged to wipe a windshield of a vehicle comprising:

a flexible retainer connected to linkages, a flexible protective cover enclosing said retainer and said linkages;

a one piece elongated and flexible wiper blade of an elastomeric material which does not deteriorate when in use at temperatures of up to 200° F. having:

an elongated and flexible mid portion;

an elongated and flexible head portion carried by the mid portion;

an elongated and flexible hinge portion carried by the mid portion;

an elongated and flexible lip portion carried by the hinge portion and having a free edge for wiping the windshield;

said hinge portion in cross-section being thin relative to adjacent portions of said mid and lip portions to permit said lip portion to rock relative to said mid portion and having generally opposed grooves opening outwardly on opposite sides of said hinge and disposed between said mid and lip portions;

an elongated passage in the mid portion and directly overlying the hinge portion and the free edge of the lip portion of the body and extending longitudinally in the mid portion generally parallel to the free edge of the lip and the passage not being greater than approximately 0.040 of an inch in diameter;

only one elongated and flexible electric resistance heater element in the wiper blade and disposed in the passage and extending longitudinally at least substantially throughout the blade and in heat transfer relationship with the adjacent hinge and lip portions and being not greater than about 0.025 of an inch in diameter;

a pair of generally opposed and outwardly opening grooves in said head portion and spaced from said hinge portion, a portion of the retainer received in said pair of grooves; and switch means for connecting the power supply of the vehicle to the heater element to heat the blade to a temperature of at least 80° F.

* * * * *